US 9,241,348 B2

United States Patent
Johansson et al.

(10) Patent No.: US 9,241,348 B2
(45) Date of Patent: Jan. 19, 2016

(54) RADIO NETWORK NODE USER EQUIPMENT AND METHODS THEREIN

(75) Inventors: Niklas A. Johansson, Uppsala (SE); Johan Bergman, Stockholm (SE); Johan Hultell, Solna (SE); Erik Larsson, Uppsala (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 123 days.

(21) Appl. No.: 13/378,392

(22) PCT Filed: Dec. 7, 2011

(86) PCT No.: PCT/SE2011/051480
§ 371 (c)(1),
(2), (4) Date: Jun. 7, 2012

(87) PCT Pub. No.: WO2012/082053
PCT Pub. Date: Jun. 21, 2012

(65) Prior Publication Data
US 2012/0314664 A1    Dec. 13, 2012

Related U.S. Application Data

(60) Provisional application No. 61/422,336, filed on Dec. 13, 2010.

(51) Int. Cl.
*H04W 74/08* (2009.01)
(52) U.S. Cl.
CPC ................... *H04W 74/0833* (2013.01)
(58) Field of Classification Search
CPC .................................. H04W 74/0833
See application file for complete search history.

(56) References Cited

U.S. PATENT DOCUMENTS

| 2008/0043671 A1* | 2/2008 | Moon et al. | 370/329 |
| 2010/0054235 A1* | 3/2010 | Kwon et al. | 370/350 |
| 2010/0311428 A1* | 12/2010 | Zhang et al. | 455/447 |
| 2010/0317382 A1* | 12/2010 | Lee et al. | 455/501 |
| 2011/0019694 A1* | 1/2011 | Kwon et al. | 370/474 |
| 2011/0305287 A1* | 12/2011 | Kwon et al. | 375/260 |

(Continued)

FOREIGN PATENT DOCUMENTS

| WO | 2004023674 A1 | 3/2004 |
| WO | 2007120020 A1 | 10/2007 |

(Continued)

OTHER PUBLICATIONS

ETSI TS 125 213 v9.2.0 "Universal Mobile Telecommunications System (UMTS); Spreading and Modulation (FDD)", Oct. 2010.*

*Primary Examiner* — Jason Mattis
(74) *Attorney, Agent, or Firm* — Patent Portfolio Builders, PLLC

(57) ABSTRACT

Embodiments herein relate to a method in a user equipment (10) for requesting access to a radio communications network (1), which user equipment (10) comprises at least two transmit antenna ports. The user equipment (10) obtains one or more random access preambles to be used to access the radio communications network. The user equipment (10) transmits; in case of obtaining one random access preamble, the one random access preamble over the at least two transmit antenna ports. In case of obtaining more than one random access preambles, the user equipment (10) transmits each random access preamble over a separate antenna port out of the at least two transmit antenna ports.

8 Claims, 8 Drawing Sheets

(56) References Cited

U.S. PATENT DOCUMENTS

2012/0082192 A1* 4/2012 Pelletier et al. ............... 375/219
2012/0218945 A1* 8/2012 Behravan et al. ............. 370/328

FOREIGN PATENT DOCUMENTS

| WO | 2008113039 A1 | 9/2008 |
| WO | 2009116819 A2 | 9/2009 |

* cited by examiner

RADIO NETWORK NODE USER EQUIPMENT AND METHODS THEREIN

TECHNICAL FIELD

Embodiments herein relate to a radio network node, a user equipment and methods therein. In particular, embodiments herein relate to enable access to the radio communications network.

BACKGROUND

In today's radio communications networks a number of different technologies are used, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. A radio communications network comprises radio base stations providing radio coverage over at least one respective geographical area forming a cell. The cell definition may also incorporate frequency bands used for transmissions, which means that two different cells may cover the same geographical area but using different frequency bands. User equipments (UE) are served in the cells by the respective radio base station and are communicating with respective radio base station. The user equipments transmit data over an air or radio interface to the radio base stations in uplink (UL) transmissions and the radio base stations transmit data over an air or radio interface to the user equipments in downlink (DL) transmissions.

Currently the Third Generation Partnership Project (3GPP) is evaluating the potential benefits of uplink transmit (Tx) diversity (TxD) in the context of High-Speed Uplink Packet Access (HSUPA). With uplink transmit diversity user equipments that are equipped with two or more transmit antennas are capable of utilizing all of them. FIG. 1 is a schematic overview depicting an example of a user equipment using uplink TxD. The uplink TxD is achieved by multiplying a signal s(t) with a set of complex weights $v_i$. The weights may e.g. define level of amplification, precoding or similar. Note that i=1 . . . N where N denotes the number of transmit antennas, $a_1$-$a_N$. The rationale behind uplink transmit diversity is to adapt the antenna weights so that the user equipment and network performance are maximized in terms of bitrate. Depending on implementation in the user equipment, the antenna weights may be associated with different constraints. Within 3GPP two classes of constraints are considered. Firstly, a class called switched antenna diversity, where the user equipment at any given time-instance transmits from one of the transmit antennas only. Thus if $v_i \neq 0$, $v_j = 0$ for all $j \neq i$. Secondly, a class called beamforming, where the user equipment at a given time-instance can transmit from more than one transmit antenna simultaneously. While switched antenna diversity is possible for UE implementations with a single Power Amplifier (PA) the beamforming implementation may require one PA for each transmit antenna. Switched antenna diversity may be seen as a special case of beamforming where one of the two antenna weights is 1, i.e. switched on, and the other one is 0, i.e. switched off.

Because the radio propagation channels, $h_{1,1}$-$h_{N,M}$, from the multiple transmit antennas $a_1$-$a_N$ to the receiver antennas, $b_1$-$b_M$, differ, the user equipment and network performance depends on how the multiple antennas are used. A radio network node, e.g. a radio base station, comprises a combiner that combines all the received signals. By using switched antenna diversity or beamforming a gain may be achieved compared to transmission from a single transmit antenna, for example by transmitting from the transmit antenna with the best radio propagation conditions as often as possible. This is the main idea behind these uplink transmit diversity schemes.

In current radio communications networks, e.g. in WCDMA, user equipments in idle state monitor the system information of a radio base station within range to inform itself about candidate radio base stations in the service area etc. When a user equipment needs access to services, the user equipment sends a request over the Random Access Channel (RACH) to a Radio Network Controller (RNC) via the most suitable radio base station, typically the one with the most favorable radio conditions. Since the uplink propagation is only approximately known, the user equipment gradually increases the transmission power of a random access preamble until either the random access preamble has been acknowledged via the downlink Acquisition Indicator Channel (AICH), or the maximum number of attempts of transmitting the random access preamble has been reached. Upon acknowledgement of the random access preamble, the RACH message is sent. After admission control at the RNC, the RNC initiates the connection via the most suitable radio base station if there are available resources.

For each transmission the user equipment selects a random access preamble at random among up to 16 available random access preambles. Each preamble of length 4096 chips is constructed from signature sequences that are scrambled with a scrambling code. The signature sequences are e.g. 256 repetitions of orthogonal 16-chip Hadamard sequences. The random access preamble is typically detected using a matched filter that is matched to the random access preamble signal. The power of the output of the matched filter is typically compared to a detection threshold for random access preamble, and the random access preamble is acknowledged when the output exceeds the detection threshold.

Uplink transmit diversity schemes, such as switched antenna diversity or beamforming, require some knowledge or information about the radio transmission conditions for the multiple transmit antennas. That information may be obtained by explicit feedback from the radio base station, or by measuring how successful previous transmissions have been.

The problem is that the random access preamble, also referred to as the RACH preamble, is the first to be transmitted by a user equipment in WCDMA. That means that the radio communications network and the radio base station is unaware of the user equipment, so no feedback is received, and the user equipment has no immediate previous transmissions to use to select transmit antenna or antenna weights. Also, before a successful random access the radio communications network does not know if the user equipment has uplink transmit diversity capability or not. Therefore it is hard to benefit from the uplink transmit diversity that multiple transmit antennas may give.

SUMMARY

An object of embodiments herein is to increase the gain in using uplink transmit diversity in a radio communications network.

According to an aspect of embodiments herein the object may be achieved by a method in a user equipment for requesting access to a radio communications network. The user equipment comprises at least two transmit antenna ports. The user equipment obtains one or more random access preambles to be used to access the radio communications network. In case of the user equipment obtains one random access preamble, the user equipment transmits the one random access preamble over the at least two transmit antenna ports. In case the user equipment obtains more than one random access preambles, the user equipment transmits each random access preamble over a separate antenna port out of the at least two transmit antenna ports.

According to another aspect the object may be achieved by a user equipment for requesting access to a radio communications network. The user equipment comprises at least two transmit antenna ports, and an obtaining circuit configured to obtain one or more random access preambles to be used to access the radio communications network. The user equipment further comprises a transmitter configured, in case the obtaining circuit obtains one random access preamble, to transmit the one random access preamble over the at least two transmit antenna ports. In case of the obtaining circuit obtains more than one random access preambles, the transmitter is configured to transmit each random access preamble over a separate antenna port out of the at least two transmit antenna ports.

According to yet another aspect the object may be achieved by a method in a radio network node for enabling a user equipment within a radio communications network to request access to the radio communications network. The radio network node scans for a first random access preamble and a second random access preamble from the user equipment. The radio network node then detects at least one random access preamble out of the first random access preamble and the second random access preamble. The radio network node transmits, to the user equipment, an acknowledgement of the at least one random access preamble.

According to still another aspect the object may be achieved by a radio network node for enabling a user equipment within a radio communications network to request access to the radio communications network. The radio network node comprises a scanning circuit configured to scan for a first random access preamble and a second random access preamble from the user equipment. The radio network node further comprises a detecting circuit configured to detect at least one random access preamble out of the first random access preamble and the second random access preamble. Additionally, the radio network node comprises a transmitter configured to transmit to the user equipment (10) an acknowledgement of the at least one random access preamble.

A concept of embodiments herein is to make use of multiple transmit antennas for a random access request. That is either done by simultaneously transmitting the same or different random access preamble through several transmit antenna ports, or by alternating between the transmit antenna ports during random access procedures.

An advantage of embodiments herein is that it enables random access requests to benefit from the transmit diversity that multiple transmit antennas offer. This will improve random access performance and by utilizing transmit diversity the typical transmit power required for random access may often be lowered, and hence, the interference level in the system is reduced and system performance improved. Hence, the random access requests benefit from the transmit diversity since the random access preamble, and after that a request message, is transmitted from both transmit antenna ports, so if a radio channel for one transmit antenna port is better, the random access preamble will have a chance to enjoy this better channel. A "diversity gain" is a gain that comes from the possibility to select and exploit the "better" transmit antenna port.

BRIEF DESCRIPTION OF THE DRAWINGS

Embodiments will now be described in more detail in relation to the enclosed drawings, in which.

DETAILED DESCRIPTION

Figure 2:
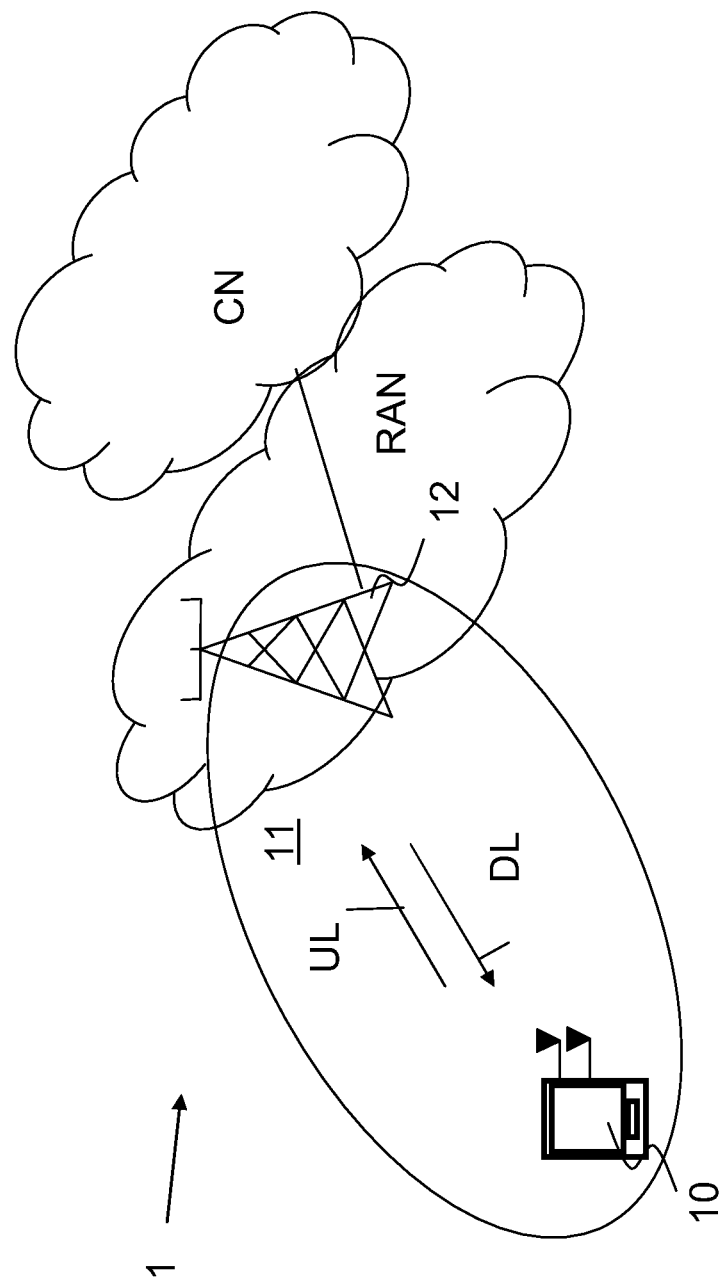
FIG. 2 is a schematic overview depicting a radio communications network according to embodiments herein.

FIG. 2 is a schematic overview depicting a radio communications network 1 according to embodiments herein. The radio communications network 1 may be an LTE-advanced network, a LTE network, Universal Terrestrial Radio Access Network (UTRAN)-General Packet Radio Service (GPRS) network, a WCDMA network, a Code Division Multiple Access (CDMA) 2000 network, an Interim Standard 95 (IS-95) network, a Digital-Advanced Mobile Phone Service (D-AMPS) network etc.

Figure 1:
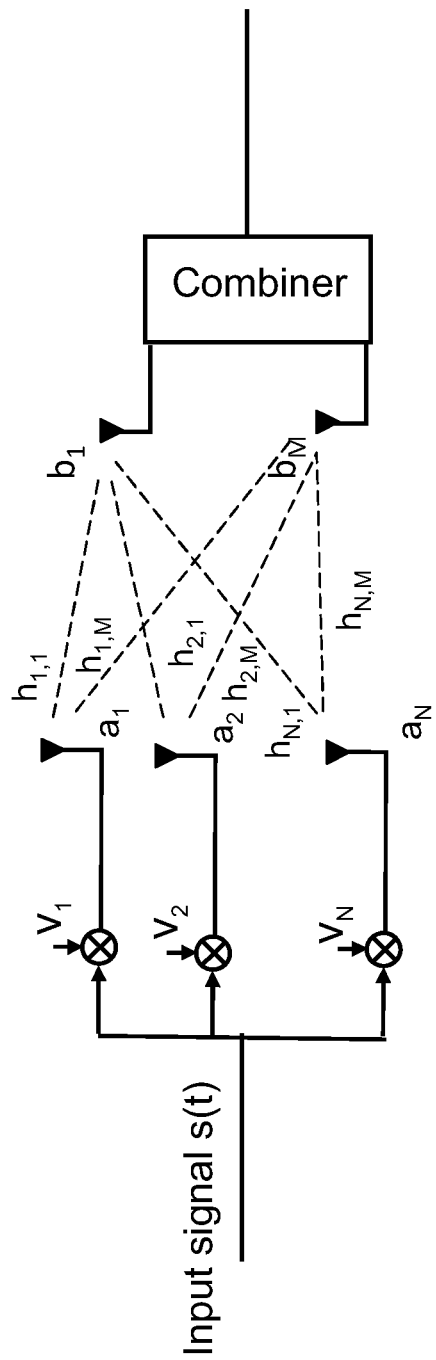
FIG. 1 is a schematic block diagram illustrating an uplink transmit diversity system.

The radio communications network 1 comprises a radio network node 12 exemplified in FIG. 1 as a radio base station in a Radio Access Network (RAN). The RAN provides access to a Core Network (CN). The radio network node 12 serves or controls radio resources over a geographical area forming a cell 11.

A user equipment 10 is served in the cell 11 by the radio network node 12. It should be understood by the skilled in the art that "user equipment" is a non-limiting term which means any wireless terminal, device or node e.g. Personal Digital Assistant (PDA), laptop, mobile, sensor, relay, mobile tablets or even a small base station communicating within respective cell.

The radio network node 12 may in some embodiments be exemplified as a radio network controller (RNC). The RNC is capable of establishing and routing a data packet session through different network transmission paths exploiting different routing protocols. The term RNC should here not be interpreted to strictly so as to comprise only an RNC according to the 3GPP UTRAN standard, but any network control node capable of mapping a data session to different transmission paths through its different ports wherein the different transmission paths exploit different routing protocols. For instance, in case of a CDMA 2000 network, the RNC functionality described below according to embodiments herein may be realised in the Base Station Controllers (BSC) of the CDMA 2000 network. The exemplified radio base station may also be referred to as e.g. a NodeB, an evolved Node B (eNB, eNode B), a base transceiver station, Access Point Base Station, base station router, beacon node, relay node or any other network unit capable to communicate with a user equipment within the cells served by the respective radio network node 12 e.g. of the radio access technology and terminology used.

A random access procedure in WCDMA/High Speed Packet Access (HSPA) is described below, however, embodiments herein are not limited to this radio interface.

According to embodiments herein the user equipment 10 comprises at least two transmit antenna ports connected to two transmit antennas. A transmission port may in some embodiments corresponds to a separate transmit antenna. Additionally or alternatively, an antenna port may correspond to a particular set of antenna weights for all or a subset of the transmit antennas. Then different antenna ports correspond to different sets of antenna weights and a signal that is transmitted through one antenna port may be transmitted through multiple antennas. In one embodiment the mapping of antenna ports to transmit antennas may be implemented as a multiplication of the transmitted signals with a matrix in a base band processing circuit. The matrix would then comprise the antenna weights. The antenna weights might be adaptively adjusted by the user equipment 10. In some embodiments these antenna weights are based on long-term statistics, for example based on logs of how successful several previous transmissions through different combinations of the multiple antennas have been. In some embodiments measurements of the downlink channel conditions, instantly or over time, are used to determine the antenna weights, also referred to as a weight net.

The user equipment 10 obtains or selects a random access preamble to access the radio communications network 1 via the radio network node 12. The radio network node 12 may signal which random access preambles, or more exactly which signatures are available, and then the user equipment 10 may select by itself among the available random access preambles. The random access preamble is a sequence used to identify that the user equipment 10 is requesting access to the radio communications network 1. Thus, the user equipment 10 picks one access signature of those available for a given service class and an initial transmission power level for transmitting the random access preamble. The initial transmission power may be based on a received primary Common Pilot Channel (CPICH) power level. The user equipment 10 may transmit the random access preamble by picking randomly one slot out of a next set of access slots belonging to one of the Physical Random Access Channel (PRACH) sub-channels associated with a relevant service class.

The user equipment 10 transmits the random access preamble over the at least two transmit antenna ports, simultaneously or sequentially. According to some embodiments the user equipment 10 obtains a number of random access preambles, i.e. more than one random access preamble, and each of the number of random access preambles is transmitted over a separate or different transmit antenna port out of the at least two transmit antenna ports. By transmitting the random access preamble or each random access preamble over different antennas the detection of the random access preamble or preambles is facilitated in the radio network node 12.

The user equipment 10 then waits for the appropriate access indicator sent by the network, i.e. the radio network node 12, on a downlink Acquisition Indicator Channel (AICH) access slot which is paired with the uplink access slot on which the preamble was sent. The user equipment 10 then uses the antenna port of the random access preamble acknowledged or indicated as the one with the strongest received power from the radio network node 12. The user equipment 10 may then use the scrambling of the random access preamble to determine a scrambling of a subsequent RACH message, and the signature of the random access preamble determines channelization codes for the RACH message.

Figure 3:
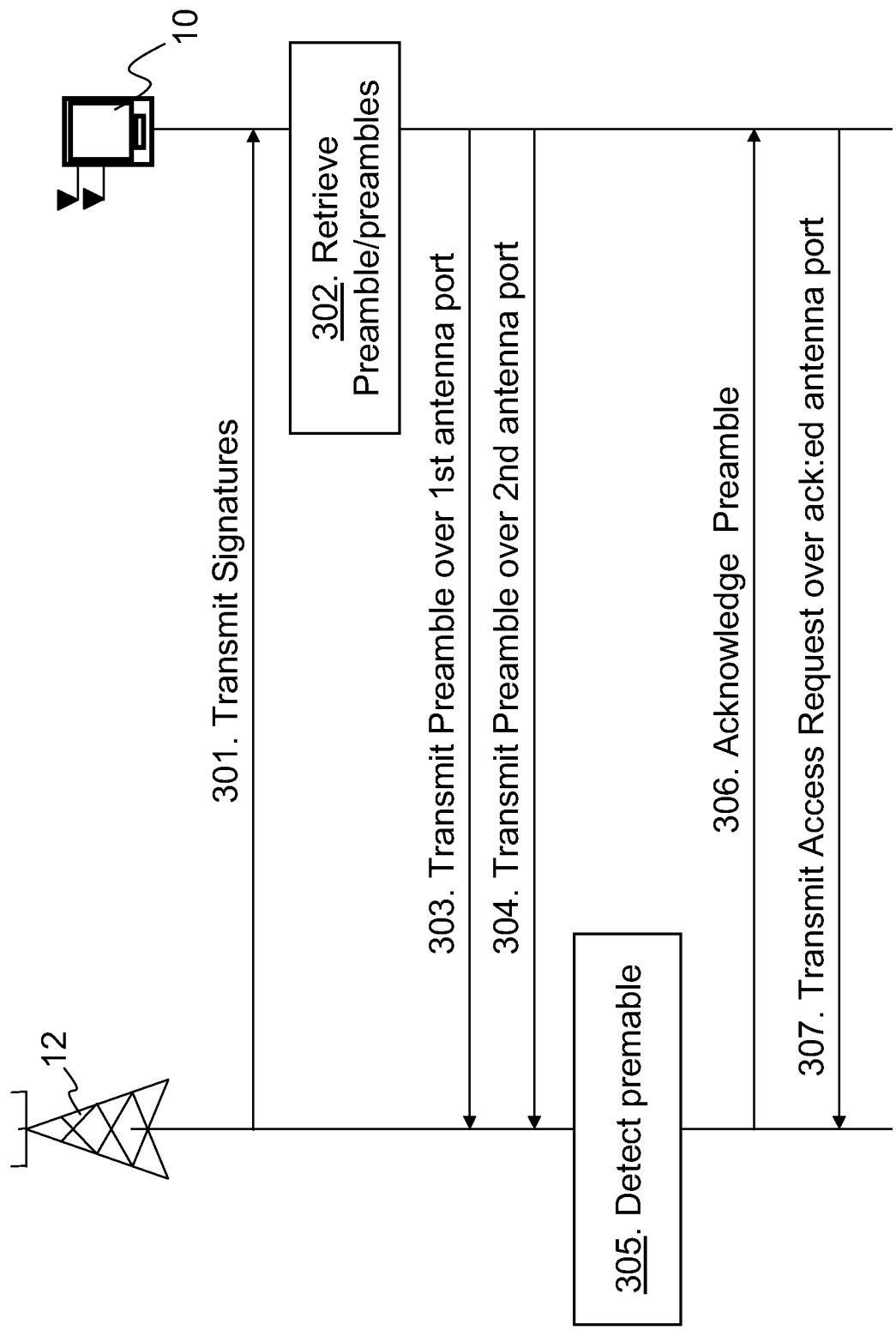
FIG. 3 is a schematic combined flowchart and signaling scheme in a radio communications network according to embodiments herein.

FIG. 3 is a schematic combined flowchart and signaling scheme according to embodiments herein.

Action 301. Initially the radio network node 12, also herein illustrated as a radio base station, transmits signature sequence and scrambling code to the user equipment 10. This may be performed during configuration or similar. Available* signature sequences and scrambling codes may be broadcasted to all, or at least many, user equipments.

Action 302. The user equipment 10 obtains or retrieves a random access preamble. That is, for each transmission the user equipment 10 selects a random access preamble at random among up to 16 available random access preambles. Each random access preamble of length 4096 chips may be constructed from the received signature sequences that are scrambled with the received scrambling code. The signature sequences may be 256 repetitions of orthogonal 16-chip Hadamard sequences.

Action 303. The user equipment 10 then transmits the random access preamble thereby initiating the random access procedure that, according to the illustrated embodiment, comprises a transmission of multiple random access preambles simultaneously or in sequence through different transmit antenna ports. According to some embodiments already existing random access preambles as defined in the 3GPP WCDMA standard 3GPP TS 25.213 v:9.2.0 , Spreading and modulation (FDD), Section 4.3.3, are used as primary random access preambles. Then several additional secondary random access preambles are constructed to be orthogonal to each other and to all other primary random access preambles, i.e. to the primary random access preamble. The user equipment 10 in the illustrated example will select one primary random access preamble and one or multiple secondary random access preambles, and as shown in Action 303, the user equipment 10 transmits this selected primary random access preamble.

Action 304. The user equipment 10 then simultaneously or sequentially through different transmit antenna ports out of the at least two transmit antenna ports, transmits the secondary random access preamble. Thus, the user equipment 10 may transmit this selected set of random access preambles simultaneously through different transmit antenna ports.

Action 305. If the radio network node 12 is unaware of the transmit diversity functionality of the user equipment 10, the radio network node 12 will only try to detect the primary random access preambles and will not notice the secondary random access preambles since they are orthogonal. However, if the radio network node 12 is aware of this uplink transmit diversity functionality, the radio network node 12 will attempt to detect the complete set of preambles, i.e. the primary random access preambles and the secondary random access preamble or preambles. The radio network node 12 may then evaluate which of the random access preambles correspond to antenna weights that would improve performance if subsequent transmissions were performed using them. Subsequent transmissions include a RACH message part, and other subsequent transmissions. It should also be noted that there is also the possibility that also the secondary preamble is one of the ones that are already in the specification. Then the radio network node 12 could detect any one of them, independently or without knowing that the random access preambles are from the same user equipment 10, or both.

Action 306. The radio network node 12 acknowledges the primary and/or the secondary random access preamble once detected by using the AICH channel. Thus, the radio network node 12 then acknowledges the user equipment 10, e.g. by sending an Acknowledgement (ACK) to the user equipment, and the radio network node 12 may also transmit feed-back which of the primary or secondary random access preambles corresponded to the best antenna weights based on the evaluation. The AICH is used as defined in the 3GPP standard to acknowledge the detection of a particular random access preamble, and in some embodiments another secondary transmission, here called a secondary AICH transmission, is used to select which one of the multiple random access preamble candidates from the user equipment 10 that is associated with the best antenna weights. In some embodiments the user equipment 10 transmits one primary and one secondary random access preamble. The secondary AICH transmission, from the radio network node 12 to the user equipment 10, determines or indicates if the set of antenna weights associated with the primary or the secondary random access preamble should be used for subsequent transmissions. This may be particularly useful in the case when transmit antenna ports correspond to two actual transmit antennas in the user equipment 10. Then the secondary AICH transmission will determine which transmit antenna should be used by the user equipment 10 for subsequent transmissions. It may also be envisioned using a secondary AICH transmission or another transmission to signal the exact, or quantized, antenna weights to use for subsequent transmissions by the user equipment 10.

Action 307. The user equipment 10 may then transmit an access request, a RACH message or an Enhanced Dedicated Channel (E-DCH) data transmission over the transmit antenna port which was used when transmitting the acknowledged random access preamble.

Figure 4:
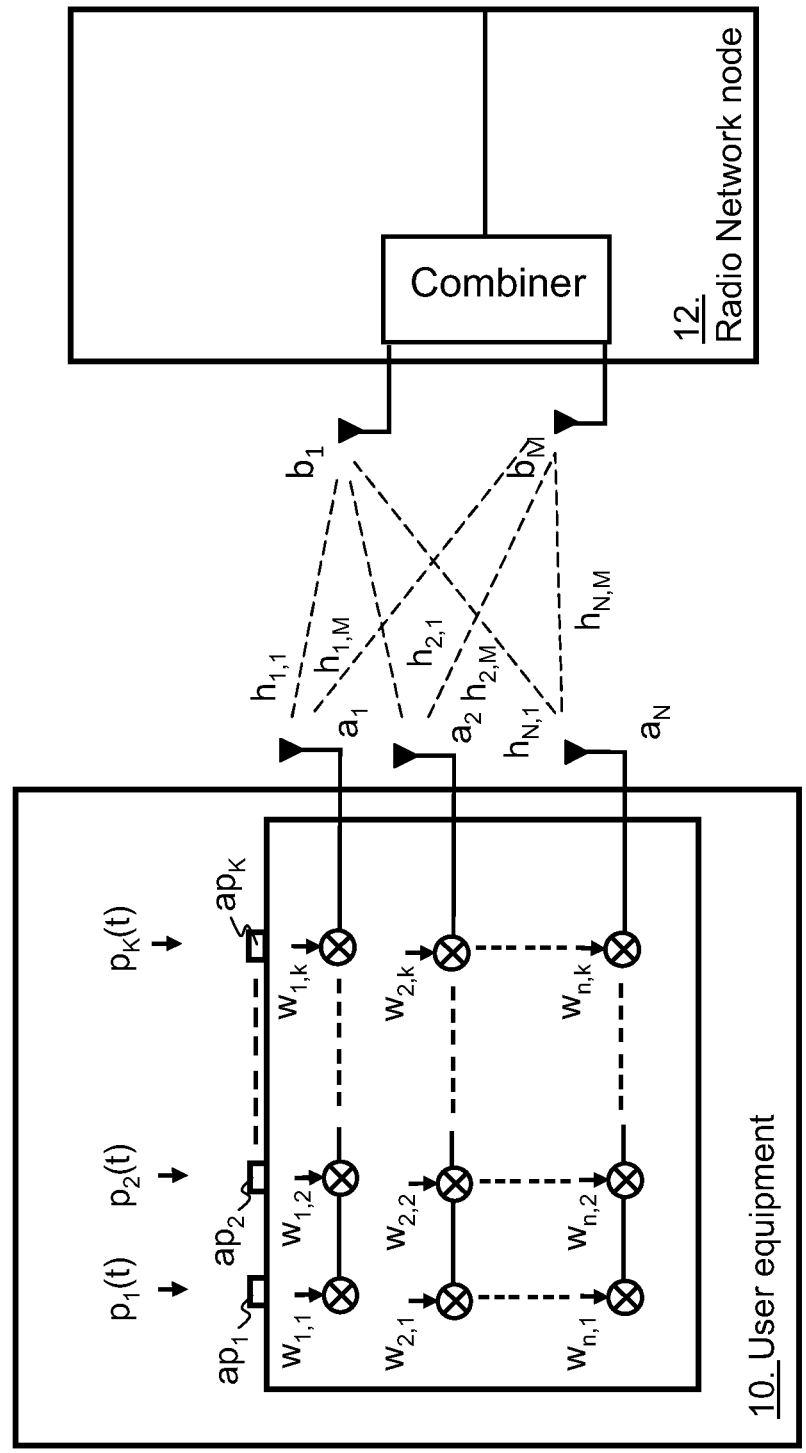
FIG. 4 is a block diagram depicting devices according to embodiments herein.

FIG. 4 illustrates how K transmit antenna ports, $ap_1$, $ap_2$-$ap_K$, are mapped to the N transmit antennas, $a_1$, $a_2$-$a_N$, by the use of complex-valued antenna weights, $w_{1,1}$-$w_{n,k}$, where k denote the transmit antenna port index and n denote the transmit antenna index. Random access preambles $p_1(t)$, $p_2(t)$-$p_K(t)$ are mapped to a corresponding transmit antenna port, $ap_1$, $ap_2$-$ap_K$. (t) indicate that it is not a scalar that is transmitted, but a complete sequence, that is, multiple chips over time. For example, a first random access preamble $p_1(t)$ may be mapped to a set of antenna weights $w_{1,1}$-$w_{n,1}$. The set of antenna weights may e.g. be 1 for $w_{1,1}$, 0 for $w_{2,1}$, and 1 for $w_{n,1}$, this means that the first random access preamble is transmitted over first transmit antenna $a_1$ and last transmit antenna $a_N$. A second random access preamble $p_2(t)$ may be mapped to a set of antenna weights $w_{1,2}$-$w_{n,2}$. The set of antenna weights may e.g. be 0 for $w_{1,2}$, 1 for $w_{2,2}$, and 0 for $w_{n,2}$, this means that the second random access preamble is transmitted over the second transmit antenna $a_2$; etc. It should here be noted as stated above that the random access preambles $p_1(t)$, $p_2(t)$-$p_K(t)$ may be one and the same random access preamble or different random access preambles. The random access preambles are transmitted over channels, $h_{1,1}$-$h_{N,M}$, to receiver antennas $b_1$-$b_M$ of the radio network node 12. The random access preambles may be combined in a combiner at the radio network node 12. Also as stated above, the antenna weights may be adaptively adjusted by the user equipment 10. For example, if the user equipment 10 has concluded that transmissions using one set of antenna weights have been particularly successful, the user equipment 10 may adjust the antenna weights illustrated in FIG. 4 so that one transmit antenna port corresponds to that particular set of antenna weights. It should be understood that the mapping may be free, or the weights for e.g. first transmit antenna port $ap_1$ may be changed freely at any time; so that e.g. first random access preamble $p_1(t)$ may be transmitted from any transmit antenna, beamform or precoding and that the transmit antenna/beamform/precoding may be changed between transmissions.

Figure 5:
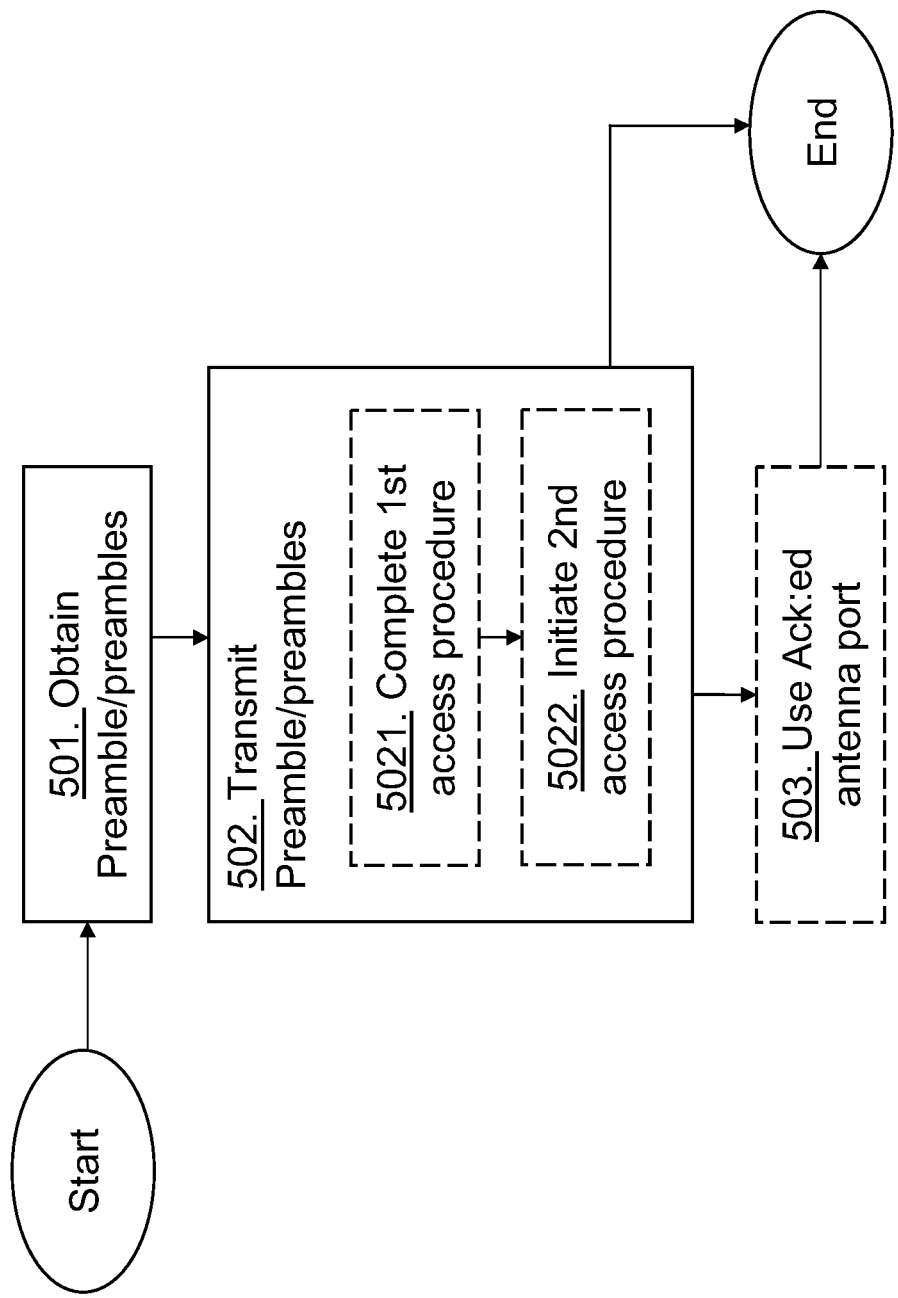
FIG. 5 is a schematic flowchart depicting methods in a user equipment according to embodiments herein.

The method actions in the user equipment 10 for requesting access to a radio communications network 1 according to some general embodiments will now be described with reference to a flowchart depicted in FIG. 5. The user equipment 10 comprises at least two transmit antenna ports. Actions performed only in some embodiments are shown as dashed boxes. The actions do not have to be taken in the order stated below, but may be taken in any suitable order.

Action 501. The user equipment 10 obtains one or more random access preambles to be used to access the radio communications network 1. Thus, in some embodiments the user equipment 10 uses one random access preamble and in some embodiments the user equipment 10 uses more than one random access preamble.

The one or more random access preambles may be random access preambles defined in Third Generation Partnership Project TS 25.213 v:9.2.0 section 4.3.3. Additionally or alternatively, in case of obtaining more than one random access preambles, the user equipment 10 selects a first random access preamble and a second random access preamble. The second random access preamble is orthogonal to the first random access preamble. A part of this method to construct new random access preambles, also referred to as random access preamble codes, that are orthogonal to each other and to the already existing ones is described herein.

According to Section 4.3.3 in 3GPP TS 25.213 v:9.2.0 the random access preamble codes are constructed as follows:

First the 16 Hadamard codes $P_s(n)$ of length 16 chips are taken from Table 3 in 3GPP TS 25.213 v:9.2.0, where s=0, 1, ..., 15 is the signature number and n=0, 1, ..., 15 is the chip index.

These Hadamard codes $P_s(n)$ are repeated 256 times to obtain 16 preamble signatures $C_{sig,s}(i)$ of length 4096 chips according to $C_{sig,s}(i)=P_s(i \text{ modulo } 16)$, i=0, 1, ..., 4095.

Then these preamble signatures are scrambled with a preamble scrambling code $S_{r\text{-}pre,n}$ defined in 3GPP TS 25.213 v:9.2.0, Sections 4.3.2.2, 4.3.3.2 to obtain final random access preamble codes $C_{pre,n,s}$ defined as $$C_{pre,n,s}(k) = S_{r\text{-}pre,n}(k) \times C_{sig,s}(k) \times e^{j(\frac{\pi}{4}+\frac{\pi}{2}k)}, k = 0, 1, 2, 3, \ldots, 4095$$

where j is defined as an imaginary number that has the property $j^2=-1$.

Typically, in the receiver of the radio network node 12 a correlator or code matched filter matched to the final random access preamble code $C_{pre,n,s}$ is used for preamble detection. It correlates or despreads the received signal by multiplying a received chip sequence by the complex conjugate of $C_{pre,n,s}$. Because the 16 Hadamard codes $P_s(n)$ of length 16 are orthogonal to each other, so will the 16 preamble signatures $C_{sig,s}(i)$ of length 4096 be. The same scrambling code $S_{r\text{-}pre,n}$ is applied to all the 16 preamble signatures, and each chip in the scrambling code has the same amplitude as defined in 3GPP TS 25.213 v:9.2.0, Sections 4.3.2.2, 4.3.3.2. Therefore the final 16 random access preamble codes $C_{pre,n,s}$ will also be orthogonal to each other.

A Hadamard matrix may be constructed as $$H_1 = [1]$$

-continued $$H_{2^k} = \begin{bmatrix} H_{2^{k-1}} & H_{2^{k-1}} \\ H_{2^{k-1}} & -H_{2^{k-1}} \end{bmatrix}, k = 1, 2, 3, K$$

For example, the Hadamard matrix of size 4×4 looks like $$H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix}.$$

The rows of a Hadamard matrix are orthogonal to each other. A sequence that is repeated according to the pattern in the Hadamard matrix will construct a number of new sequences that are also orthogonal to each other. Let for example the sequence or row vector x=[1-1 1]

be repeated according to the pattern in $H_4$:

$$J = \begin{bmatrix} x & x & x & x \\ x & -x & x & -x \\ x & x & -x & -x \\ x & -x & -x & x \end{bmatrix} =$$

$$\begin{bmatrix} 1 & -1 & 1 & | & 1 & -1 & 1 & | & 1 & -1 & 1 & | & 1 & -1 & 1 \\ 1 & -1 & 1 & | & -1 & 1 & -1 & | & 1 & -1 & 1 & | & -1 & 1 & -1 \\ 1 & -1 & 1 & | & 1 & -1 & 1 & | & -1 & 1 & -1 & | & -1 & 1 & -1 \\ 1 & -1 & 1 & | & -1 & 1 & -1 & | & -1 & 1 & -1 & | & 1 & -1 & 1 \end{bmatrix}$$

The rows of the J matrix are now orthogonal to each other.

Also if these resulting sequences are sequentially repeated the final longer sequences will be orthogonal to each other. For example the matrix $J_2$ that is constructed by sequential repetition, or horizontal concatenation, of the matrix J has orthogonal rows.

$$J_2 = [J \ J] = \begin{bmatrix} x & x & x & x & | & x & x & x & x \\ x & -x & x & -x & | & x & -x & x & -x \\ x & x & -x & -x & | & x & x & -x & -x \\ x & -x & -x & x & | & x & -x & -x & x \end{bmatrix}$$

If one of the 16 Hadamard codes $P_s(n)$ of length 16 is repeated like in the example above, but according to the 256×256 Hadamard matrix $H_{256}$ the rows of the resulting matrix will be orthogonal to each other. Each row will be of length 4096, but only the first row (the row that contains only ones in $H_{256}$) corresponds to the preamble signature $C_{sig,s}(i)$. The other 255 rows will be orthogonal to $C_{sig,s}(i)$. This procedure can be repeated for all 16 Hadamard codes $P_s(n)$, so in total 16*255=4080 codes of length 4096 are constructed. All these 4080 codes are orthogonal to each other and to all preamble signatures.

It is also possible to construct new orthogonal sequences by using smaller Hadamard matrices, and then sequentially repeating the result. The benefit of this is that also shorter parts of the new sequences are orthogonal to the corresponding parts of other signatures. For example, a 64×64 Hadamard matrix $H_{64}$ can be used to construct 16*63=1008 unused orthogonal codes of length 1024 chips that can be repeated 4 times to obtain 1008 unused orthogonal codes of length 4096 that are orthogonal and where also the four 1024-chip parts are orthogonal to the corresponding 1024-chip parts of the other sequences.

Action 502. In case of obtaining one random access preamble, the user equipment 10 transmit the one random access preamble over the at least two transmit antenna ports. In case of obtaining more than one random access preambles, the user equipment 10 transmits each random access preamble over a separate antenna port out of the at least two transmit antenna ports. Radio propagation conditions and radio channels from the different transmit antenna ports to the radio network node 12 are different, so with a same transmit power the random access preamble detection performance is different for different transmit antenna ports. If a random access preamble is transmitted over a transmit antenna port with good radio propagation conditions it will be more easily detected by the radio network node 12. Hence, by transmitting random access preambles over more than one transmit antenna port the chance that the transmission is performed over a transmit antenna port with good radio propagation conditions is increased, and, thus, the random access preamble detection performance is improved compared to a situation where all random access preambles are transmitted over only one transmit antenna port. According to some embodiments, the user equipment 10 may transmit one or more random access preambles simultaneously over the at least two antenna ports. Alternatively, the user equipment 10 may transmit the one or more random access preambles over one transmit antenna port, of the at least two transmit antenna ports, at a time in a sequential manner or sequentially. Thus, in some embodiments, only one random access preamble is transmitted at a time through each transmit antenna port. For example, for a first preamble transmission the random access preamble is transmitted through a first transmit antenna port. If the first preamble transmission is not detected the next random access preamble is typically transmitted through another transmit antenna port, possibly with altered transmit power. The procedure continues in that way, by transmitting random access preambles through different transmit antenna ports until one is detected and acknowledged by the radio network node 12. Then subsequent transmissions may be performed through this transmit antenna port, which will provide a good performance. Note that the change of transmit antenna port can be less frequent than with each new preamble transmission. In some embodiments, each transmit antenna port of the at least two transmit antenna ports correspond to an individual transmit antenna. The user equipment 10 may for each preamble transmission select a new random access preamble randomly and transmit the new random access preamble over a transmit antenna port, where the transmit antenna port is switched between two available transmit antenna ports for each transmission.

Action 5021. In some embodiments the user equipment 10 completes a first random access procedure over a first transmit antenna port out of the at least two transmit antenna ports. In some embodiments,for each random access preamble transmission a new random access preamble may be selected within the completing a first random access procedure, e.g. new random access preambles may be selected randomly for each transmission.

Action 5022. The user equipment 10 may further initiate a second random access procedure over a second transmit antenna port out of the at least two transmit antenna ports. Thus, the second random access procedure is initiated after the first random access procedure has been completed.

Thus, in some embodiments the change between transmit antenna ports is not performed for every preamble transmission, but a complete random access procedure is performed through a single antenna port, and the next random access procedure is performed through a different transmit antenna port.

Action 503. The user equipment 10 may then use the transmit antenna port on which an acknowledged random access preamble was transmitted. In yet another embodiment the simultaneous preamble transmissions by the user equipment 10 through different transmit antenna ports may be performed solely with already existing signatures. Then the radio network node 12 will treat the random access attempt as several simultaneous attempts from multiple different user equipments. The user equipment 10 will only use the antenna weights associated with one of the preambles that are acknowledged, and may be free to choose which antenna weight set to use if several of its random access preambles are detected.

In some embodiments, possibly the transmit power needed for successful preamble detection is stored for the transmit antenna port that was used when the random access preamble was detected and acknowledged by the radio network node 12. For future transmissions this information can be used to more often start the random access attempt using the best transmit antenna port. To determine which transmit antenna port is the best also information about other previous transmissions, such as data transmissions on Dedicated Channel (DCH) and E-DCH may be stored and used.

When the transmit antenna ports correspond to individual transmit antennas, transmission through only one transmit antenna at a time may mean that only one Power Amplifier (PA) is needed in the user equipment.

Hence, embodiments herein provide a method in the user equipment 10, whereby a random access request is transmitted, using a plurality of antenna ports.

It should be noted that the embodiments herein are written with the current 3GPP requirements in mind, but are by no means limited to this scenario. Similarly, the ideas can be applicable to an arbitrary number of transmit antennas.

Figure 6:
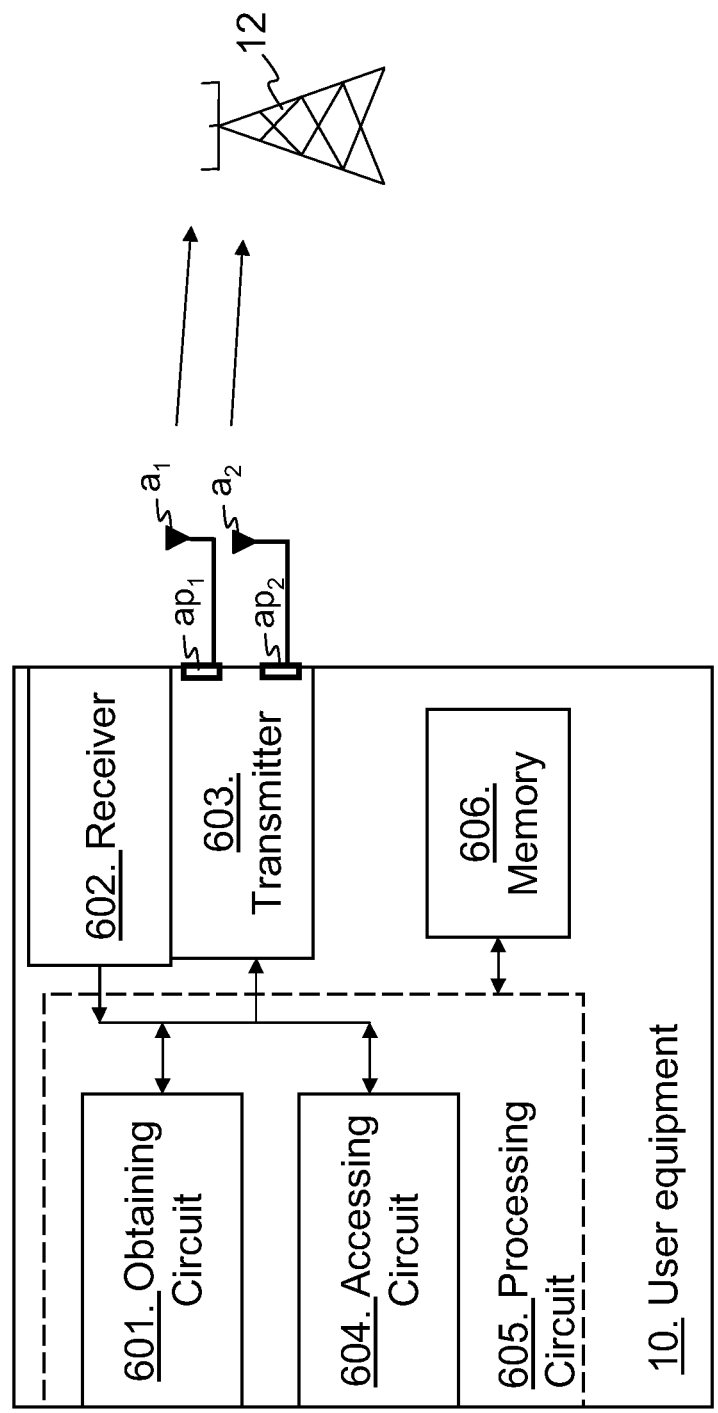
FIG. 6 is a block diagram depicting a user equipment according to embodiments herein.

FIG. 6 is a block diagram depicting the user equipment 10 for requesting access to a radio communications network 1 according to some embodiments.

The user equipment 10 comprises at least two transmit antenna ports $ap_1$, $ap_2$. In some embodiments each transmit antenna port of the at least two transmit antenna ports $ap_1$, $ap_2$ corresponds to an individual transmit antenna $a_1$, $a_2$ comprised in the user equipment 10.

Furthermore, the user equipment 10 comprises an obtaining circuit 601 configured to obtain one or more random access preambles to be used to access the radio communications network 1. The user equipment 10 may obtain the random access preamble or preambles from signatures and scrambling code received over a receiver 602 arranged in the user equipment 10. As stated above, the one or more random access preambles may be random access preambles defined in Third Generation Partnership Project TS 25.213 v:9.2.0 section 4.3.3. In some embodiments, the obtaining circuit 601 may be configured to select a first random access preamble and a second random access preamble, in case of obtaining more than one random access preambles. The second random access preamble is orthogonal to the first random access preamble.

Additionally, the user equipment 10 comprises a transmitter 603 which may be configured to transmit the one random access preamble over the at least two transmit antenna ports $ap_1$, $ap_2$, in case of the obtaining circuit 601 obtains one random access preamble. The transmitter 603 may be configured to transmit each random access preamble over a separate antenna port out of the at least two transmit antenna ports $ap_1$, $ap_2$, in case the obtaining circuit 601 obtains more than one random access preambles. In some embodiments is the transmitter 603 further configured to transmit the one or more random access preambles over one transmit antenna port, of the at least two transmit antenna ports $ap_1$, $ap_2$, at a time in a sequential manner or sequentially. The transmitter 603 may in some embodiments be further configured to complete a first random access procedure over a first transmit antenna port $ap_1$ out of the at least two transmit antenna ports $ap_1$, $ap_2$. Then, the transmitter 603 is further configured to initiate a second random access procedure over a second transmit antenna port $ap_2$ out of the at least two transmit antenna ports $ap_1$, $ap_2$. Alternatively, the transmitter 603 may be configured to transmit the one or more random access preambles simultaneously over the at least two antenna ports $ap_1$, $ap_2$.

The user equipment 10 may further comprise an accessing circuit 604. The accessing circuit 604 is configured to, based on received acknowledgment of random access preambles, using the transmit antenna port of the acknowledged random access preamble.

The embodiments herein for requesting access to the radio communications network 1 may be implemented through one or more processors, such as a processing circuit 605 in the user equipment 10 depicted in FIG. 6, together with computer program code for performing the functions and/or method actions of the embodiments herein. The program code mentioned above may also be provided as a computer program product, for instance in the form of a data carrier carrying computer program code for performing embodiments herein when being loaded into the user equipment 10. One such carrier may be in the form of a CD ROM disc. It is however feasible with other data carriers such as a memory stick. The computer program code may furthermore be provided as pure program code on a server and downloaded to the user equipment 10. Furthermore, the user equipment 10 may comprise a memory 606. The memory 606 may comprise one or more memory units and may be used to store data on, such as signatures, scrambling codes, random access preambles, number of attempts, power settings of the random access procedure, applications that perform the method when being executed on the processing circuit, and similar.

Figure 7:
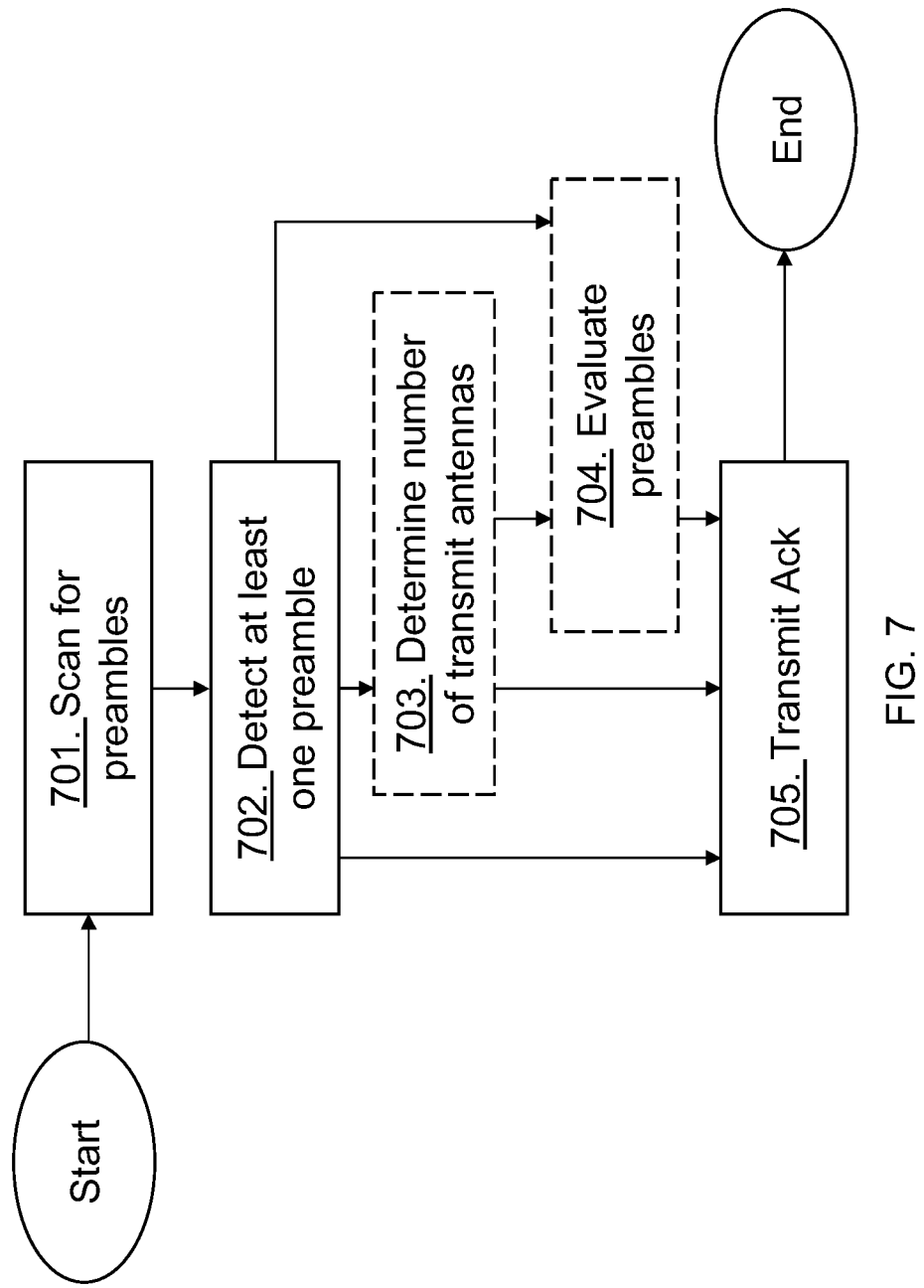
FIG. 7 is a schematic flowchart depicting methods in a radio network node according to embodiments herein.

The method actions in the radio network node 12, exemplified as a radio base station in the figures, for enabling the user equipment 10 within the radio communications network 1 to request access to the radio communications network 1 according to some general embodiments will now be described with reference to a flowchart depicted in FIG. 7. The radio network node 12 may assume that two random access preambles may have been transmitted from the user equipment 10, and the radio network node 12 tries to detect the two random access preambles. Actions performed only in some embodiments are shown as dashed boxes. The actions do not have to be taken in the order stated below, but may be taken in any suitable order.

Action 701. The radio network node 12 scans for a first random access preamble and a second random access preamble from the user equipment 10. E.g. the radio network node 12 searches or process signals for the first and second random access preambles jointly or simultaneously. Thus, the radio network node 12 tries to detect the first and second random access preamble at a same position in a signal slot. Alternatively, when the random access preambles are transmitted in different access slots, the radio network node 12 tries to detect the first and second random access preamble at a corresponding position in a second access slot as in a first slot since both the antennas exist in the same location. The radio network node 12 may further add outputs from two correlators to perform a combined detection of the random access preambles instead of performing two separate detections; this combined detection may result in a better performance. In some embodiments the radio network node 12 may know which random access preambles are allowed to use, e.g. a secondary preamble being a dependent random access preamble to a primary preamble, and scans for these two random access preambles.

Thus, the radio network node 12 may scan a range of a received signal that corresponds to the distance 0 km-cell radius, when the cell radius is 10 km then a scan or search window is 256 chip long or 67 micro seconds for the random access preambles. The scan may be performed by correlating with the known random access preambles. Then, when a result exceeds a threshold value the random access preamble is detected (see below).

Action 702 The radio network node 12 detects at least one random access preamble out of the first random access preamble and the second random access preamble.

Action 703. The radio network node 12 may determine that the user equipment 10 comprises at least two transmit antenna ports based on the detected at least one random access preamble. E.g. if the radio network node 12 detects both random access preambles, then the radio network node 12 will know that the user equipment 10 has two antenna ports. It may also be specified that a specific relationship exists between these random access preambles, such that user equipments with two transmit antenna ports—always have to transmit one primary preamble and one corresponding, new, secondary preamble orthogonal to today's preambles. The radio network node 12 may then take some measure based on this specific relationship. Instead of using the already existing preambles defined in the 3GPP standard as primary random access preambles, new random access preambles may be used for all random access preamble transmissions by the user equipment 10, which is transmit diversity enabled. Then the radio network node 12 may determine that the user equipment 10 is using this transmit diversity mode, but a transmit diversity-unaware radio network node will not detect the user equipment 10.

Action 704. When both the first random access preamble and the second random access preamble are detected, the radio network node 12 may evaluate the detected random access preambles based on received power of the random access preambles. The radio network node 12 may then transmit, in action 705 to the user equipment 10, feedback information indicating which one of the random access preambles that corresponds to antenna weights that would improve performance for subsequent transmissions, thus, indicating which antenna weights to use associated to one of the random access preambles. For example, the radio network node 12 may evaluate by e.g. deciding which random access preamble had the highest received power. If the random access preambles were transmitted with the same power the random access preamble with the highest received power would correspond to an antenna port that should be good also for subsequent data transmissions, since the subsequent data transmissions also will have higher received power in this case. However, if transmitted with different power the random access preamble with a lowest pathloss will correspond to an antenna port that should be good also for subsequent data transmissions.

Action 705. The radio network node 12 transmits to the user equipment 10, an acknowledgement of the at least one random access preamble. In some embodiments the acknowledgement is transmitted on an acquisition indicator channel. In some embodiments, where both the first random access preamble and the second random access preamble are detected, the user equipment 10 transmits separate acknowledgements of the detected two random access preambles in separate transmissions. In some embodiments the radio network node 12 transmits the acknowledgement only for the random access preamble that corresponds to antenna weights that would improve performance for subsequent transmissions, thus, only for the random access preamble of which antenna weights are to be used. In some embodiments the radio network node 12 transmits at least one acknowledgement of the detected two random access preambles and a separate transmission indicating which one of the random access preambles that corresponds to antenna weights that would improve performance for subsequent transmissions, thus, indicating which antenna weights to use associated to one of the random access preambles.

The first random access preamble may be acknowledged in the first AICH transmission and the second random access preamble may be acknowledged in the second AICH transmission.

In one embodiment the secondary AICH transmission is transmitted simultaneously with the primary AICH transmission, where the primary one is the one specified in the 3GPP standard. In this embodiment the secondary AICH uses the Acquisition Indicator (AI) signatures or the Extended Acquisition Indicator (EAI) signatures, defined in the 3GPP specification 3GPP TS 25.211 v10.0.0, Section 5.3.3.7 Table 22 and Table 22B, that are configured not to be used for the primary AICH transmission in the cell 11. By using AI or EAI signatures that are configured to not be used for primary AICH transmission in the current cell lithe secondary AICH transmission will be backward compatible and user equipments that are not aware of this feedback will not notice it. The actual symbol transmitted with the secondary AICH transmission may be assigned meanings as: a '1' means that the first transmit antenna port, from which the primary preamble was transmitted, should be used, a '−1' means that the second transmit antenna port should be used, and a '0' means that the user equipment 10 may decide what transmit antenna port to use for subsequent transmissions.

In some embodiments the network, e.g. the radio network node 12, informs the user equipment 10 which random access preambles and/or AIs and/or EAIs that are used for user equipments with transmit diversity capability. In some embodiments the secondary AICH transmission is performed using another spreading code than the first AICH transmission. The advantage would be that instead of being limited to 16 possible AI or EAI for both primary and secondary preamble detection acknowledgement, there would be 32 possible AI or EAI. Each spreading code has 16 AI and EAI. Of course the secondary AICH transmission on another spreading code could use another structure, e.g. other spreading factor, other meanings of the transmitted symbols, to carry more information.

Additionally, the secondary AICH transmission may instead use all or a subset of the previously unused last 1024 chips associated with an access slot in the AICH, 3GPP TS 25.211 Section 5.3.3.7, to signal the feedback about what set of antenna weights is most suitable for subsequent transmissions, thus, utilizing resources in an efficient manner.

Figure 8:
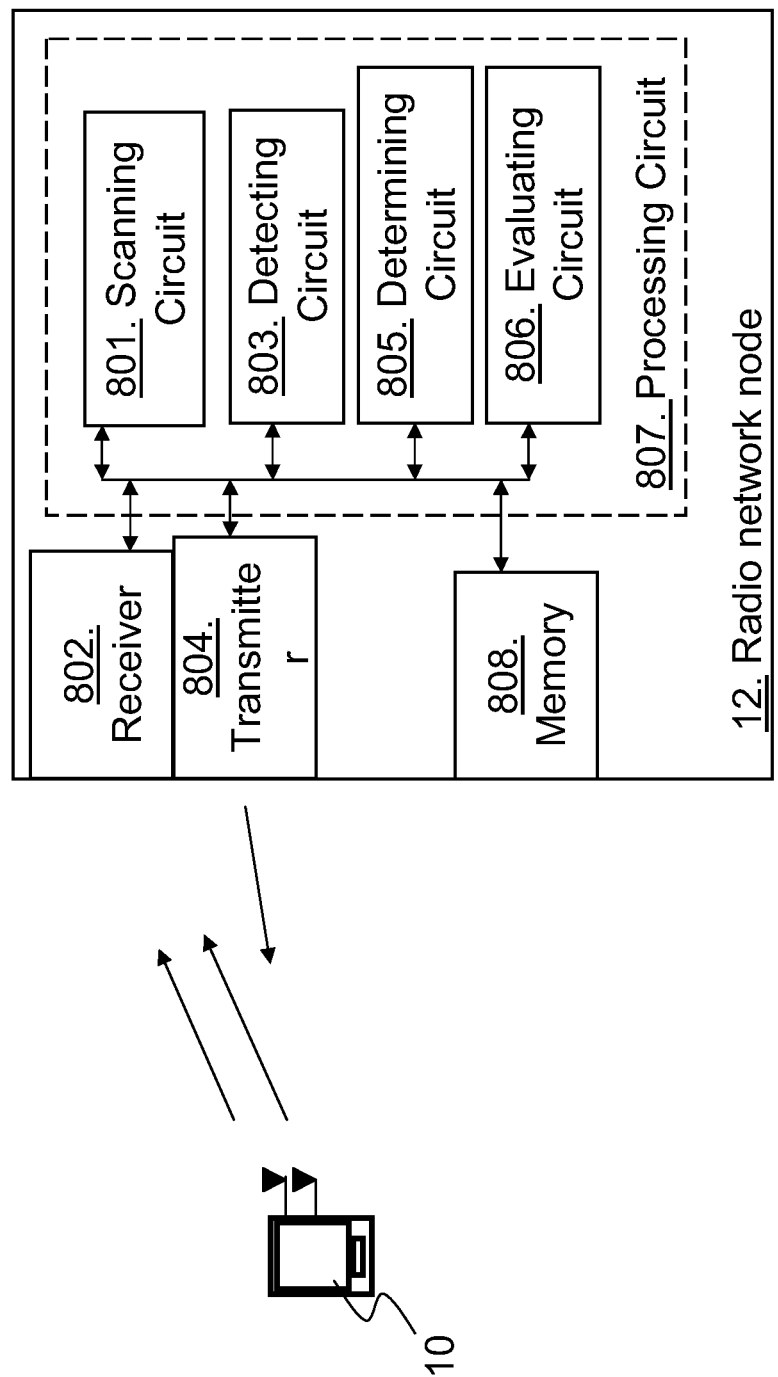
FIG. 8 is a block diagram depicting a radio network node according to embodiments herein.

FIG. 8 is a block diagram depicting the radio network node 12 enabling the user equipment 10 within the radio communications network 1 to request access to the radio communications network 1 according to some embodiments.

The radio network node 12 comprises a scanning circuit 801 configured to scan for a first random access preamble and a second random access preamble from the user equipment 10. E.g. the radio network node 12 may scan signals received over a receiver 802 from user equipments within the cell 11.

The radio network node 12 comprises a detecting circuit 803 configured to detect at least one random access preamble out of the first random access preamble and the second random access preamble.

In addition, the radio network node 12 comprises a transmitter 804 configured to transmit to the user equipment (10) an acknowledgement of the at least one random access preamble. The transmitter 804 may furthermore be configured to transmit the acknowledgement on an acquisition indicator channel. In some embodiments the detecting circuit 803 may be configured to detect both the first random access preamble and the second random access preamble. The transmitter 804 may then be configured to transmit separate acknowledgements of the detected two random access preambles in separate transmissions. The transmitter 804 may further be configured to transmit the acknowledgement only for the random access preamble that corresponds to antenna weights that would improve performance for subsequent transmissions, thus, only for the random access preamble which antenna weights are to be used. The transmitter 804 may further be configured to transmit at least one acknowledgement of the detected two random access preambles and a separate transmission indicating which one of the random access preambles that corresponds to antenna weights that would improve performance for subsequent transmissions, thus, indicating which antenna weights to use associated to one of the random access preambles.

The radio network node 12 may comprise a determining circuit 805 configured to determine that the user equipment 10 comprises at least two transmit antenna ports based on the detected at least one random access preamble.

The radio network node 12 may further comprise an evaluating circuit 806 configured to evaluate, when the detecting circuit 803 is configured to detect both the first random access preamble and the second random access preamble, the detected random access preambles based on received power of the random access preambles. The transmitter 804 may then transmit feedback information to the user equipment 10, which one of the random access preambles that corresponds to antenna weights that would improve performance for subsequent transmissions, thus, indicating which antenna weights to use associated to one of the random access preambles.

The embodiments herein for requesting access to the radio communications network 1 may be implemented through one or more processors, such as a processing circuit 807 in the radio network node 12 depicted in FIG. 8, together with computer program code for performing the functions and/or method actions of the embodiments herein. The program code mentioned above may also be provided as a computer program product, for instance in the form of a data carrier carrying computer program code for performing embodiments herein when being loaded into the radio network node 12. One such carrier may be in the form of a CD ROM disc. It is however feasible with other data carriers such as a memory stick. The computer program code may furthermore be provided as pure program code on a server and downloaded to the user equipment 10. Furthermore, the radio network node 12 may comprise a memory 808. The memory 808 may comprise one or more memory units and may be used to store data on, such as signatures, scrambling codes, random access preambles, signal strength measurements, number of attempts, power settings of the random access procedure, applications that perform the method when being executed on the processing circuit, and similar.

Those skilled in the art will also appreciate that the various "circuits" described may refer to a combination of analog and digital circuits, and/or one or more processors configured with software and/or firmware (e.g., stored in memory) that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method in a user equipment for requesting access to a radio communications network, the user equipment comprising at least two transmit antenna ports, the method comprising:
   obtaining different random access preambles to be used to access the radio communications network; and
   transmitting the different random access preambles over one transmit antenna port out of the at least two transmit antenna ports, wherein a first random access procedure comprises to transmit the different random access preambles over the one transmit antenna port, by:
   transmitting a first one of the different random access preambles over a first transmit antenna port out of the at least two transmit antenna ports, the first one of the different random access preambles comprising a first random access preamble;
   thereafter, transmitting a second one of the different random access preambles over a second transmit antenna port out of the at least two transmit antenna ports before receiving an acknowledgement regarding the transmission of the first random access preamble, the second one of the different random access preambles comprising a second random access preamble different from the first random access preamble; and
   thereafter, receiving an acknowledgement regarding one of the first and second random access preambles, wherein the acknowledgement comprises feedback information indicating which antenna weights to associate with one of the first and second random access preambles.

2. A method according to claim 1, wherein the different random access preambles comprise different random access preambles defined in Third Generation Partnership Project TS 25.213 v: 9.2.0 section 4.3.3.

3. A method according to claim 1, wherein obtaining the different random access preambles comprises selecting the first random access preamble and selecting the second random access preamble orthogonal to the first random access preamble.

4. A method according to claim 1, wherein each transmit antenna port of the at least two transmit antenna ports corresponds to an individual transmit antenna.

5. A user equipment for requesting access to a radio communications network, the user equipment comprising:

at least two transmit antenna ports;

an obtaining circuit configured to obtain different random access preambles to be used to access the radio communications network; and a transmitter configured to transmit each different random access preamble over one transmit antenna port out of the at least two transmit antenna ports, wherein a first random access procedure comprises to transmit the different random access preambles over the one transmit antenna port, and wherein the transmitter is further configured to:

transmit a first one of the different random access preambles over a first transmit antenna port out of the at least two transmit antenna ports, the first one of the different random access preambles comprising a first random access preamble;

thereafter, transmit a second one of the different random access preambles over a second transmit antenna port out of the at least two transmit antenna ports after the completion of the first random access procedure before receiving an acknowledgement regarding the transmission of the first random access preamble, the second one of the different random access preambles comprising a second random access preamble; and thereafter, receive an acknowledgement regarding one of the first and second random access preambles, wherein the acknowledgement comprises feedback information indicating which antenna weights to associate with one of the first and second random access preambles.

6. The user equipment according to claim 5, wherein the different random access preambles comprise different random access preambles defined in Third Generation Partnership Project TS 25.213 v:9.2.0 section 4.3.3.

7. The user equipment according to claim 5, wherein the obtaining circuit is configured to obtain the different random access preambles by selecting the first random access preamble and selecting the second random access preamble orthogonal to the first random access preamble.

8. The user equipment according to claim 5, wherein each transmit antenna port of the at least two transmit antenna ports corresponds to an individual transmit antenna comprised in the user equipment.

* * * * *